(12) United States Patent
McDonald

(10) Patent No.: US 7,343,877 B1
(45) Date of Patent: Mar. 18, 2008

(54) BIRDCAGE

(76) Inventor: John Scott McDonald, 4202 E. Elwood St.-#27, Phoenix, AZ (US) 85040

( * ) Notice: Subject to any disclaimer, the term of this patent is extended or adjusted under 35 U.S.C. 154(b) by 59 days.

(21) Appl. No.: 11/287,119

(22) Filed: Nov. 22, 2005

(51) Int. Cl.
*A01K 39/01* (2006.01)

(52) U.S. Cl. .................. 119/477; 119/429; 119/462; 119/464; 119/468

(58) Field of Classification Search .......... 119/428, 119/429, 432, 462, 463, 464, 468, 469, 470
See application file for complete search history.

(56) References Cited

U.S. PATENT DOCUMENTS

| | | | |
|---|---|---|---|
| 171,980 A | 1/1876 | Breck | |
| 1,491,967 A | 4/1924 | Overton | |
| 1,961,359 A | 6/1934 | Herbst et al. | |
| 2,693,786 A | 11/1954 | Babros et al. | |
| 2,864,335 A | 12/1958 | Yellin | |
| 3,494,330 A | 2/1970 | Suntagata et al. | |
| 3,499,674 A | 3/1970 | Voran et al. | |
| D219,277 S | 11/1970 | Benjamin | |
| 3,738,322 A | 6/1973 | Smith | |
| D274,152 S | 6/1984 | Fleming | |
| 4,666,109 A * | 5/1987 | Fallon et al. | ................. 248/50 |
| 4,793,284 A | 12/1988 | Davis | |
| 5,349,924 A | 9/1994 | Hooper, Jr. | |
| 5,467,733 A | 11/1995 | Messina | |
| 5,738,042 A | 4/1998 | King | |
| 7,146,932 B2 * | 12/2006 | Willinger et al. | ........... 119/461 |
| 7,152,553 B2 * | 12/2006 | Poirier et al. | ............... 119/464 |
| 2002/0152969 A1 | 10/2002 | Grigsby et al. | |
| 2004/0140677 A1 * | 7/2004 | Hengelein et al. | .......... 292/201 |

* cited by examiner

*Primary Examiner*—Peter M. Poon
*Assistant Examiner*—Willie Berry, Jr.
(74) *Attorney, Agent, or Firm*—Mathew R. P. Perrone, Jr.; Brie A. Crawford

(57) ABSTRACT

A bird cage has at least one flush mounted door for the cage when door is opened; and an accessible feed receiver for the cage, which can be retrieved and serviced without reaching inside the cage. An arcuate perch permits access to the feed receiver.

3 Claims, 9 Drawing Sheets

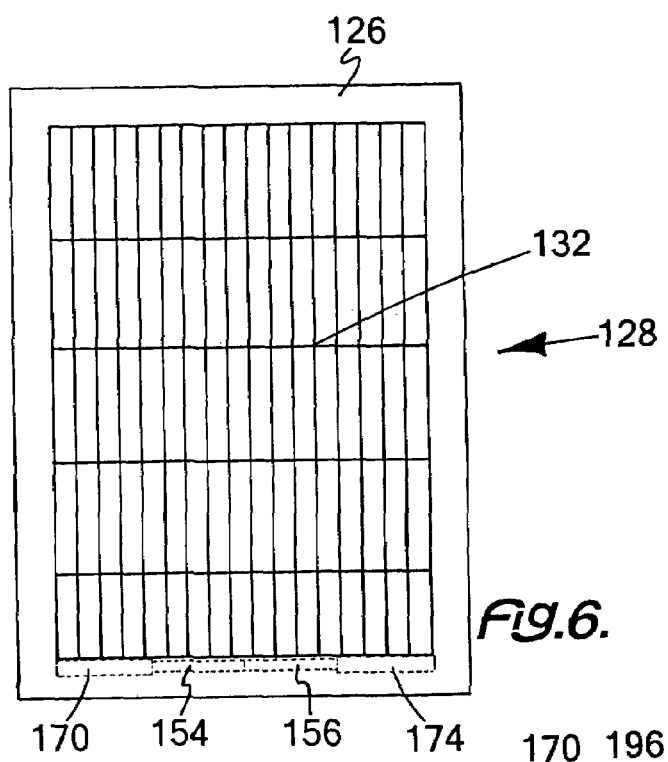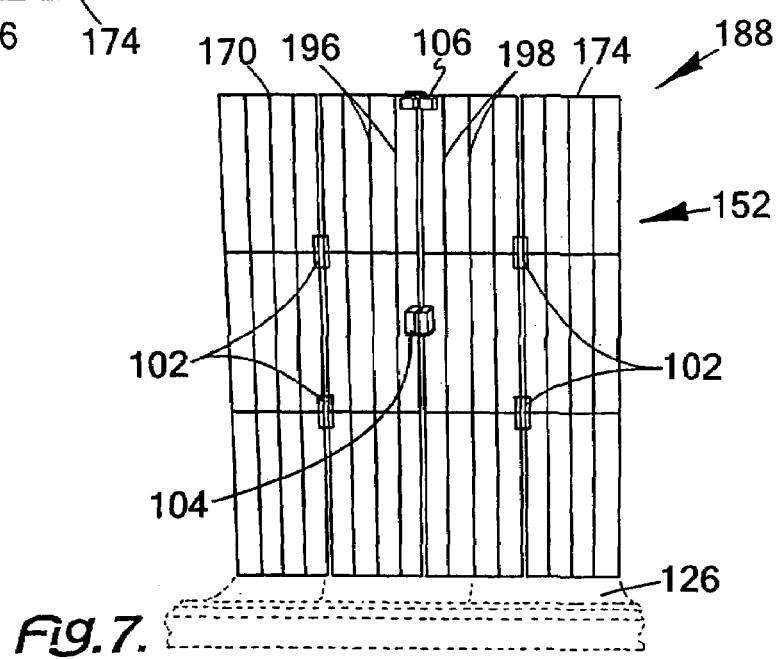

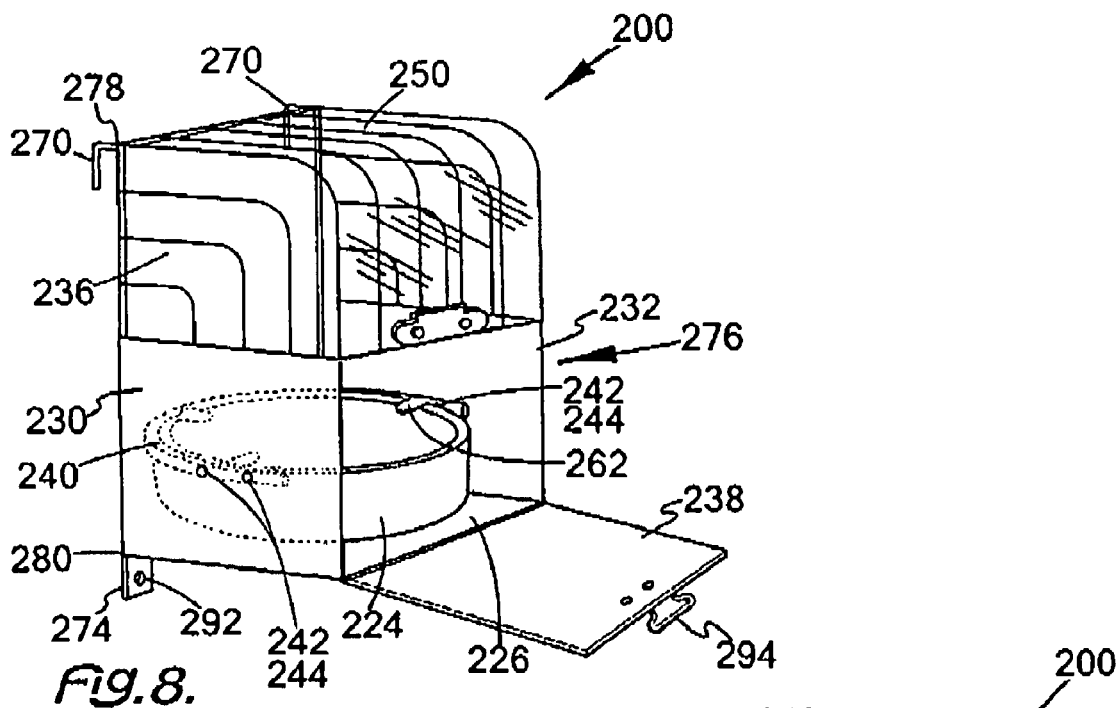
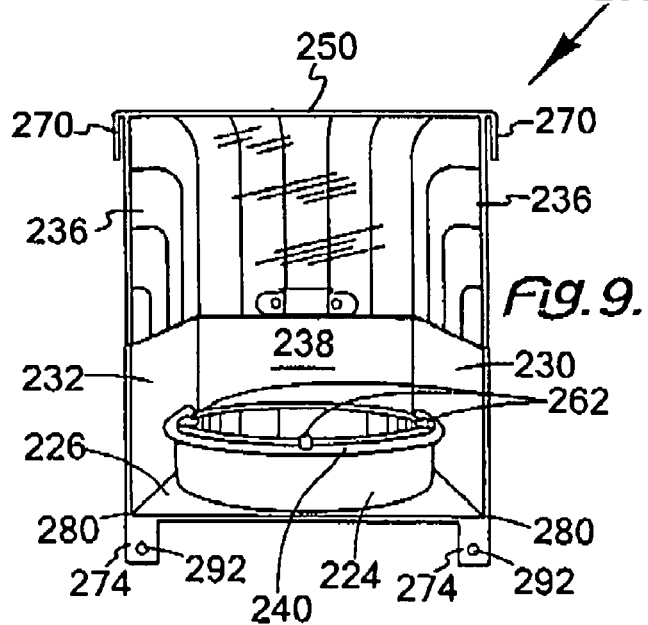

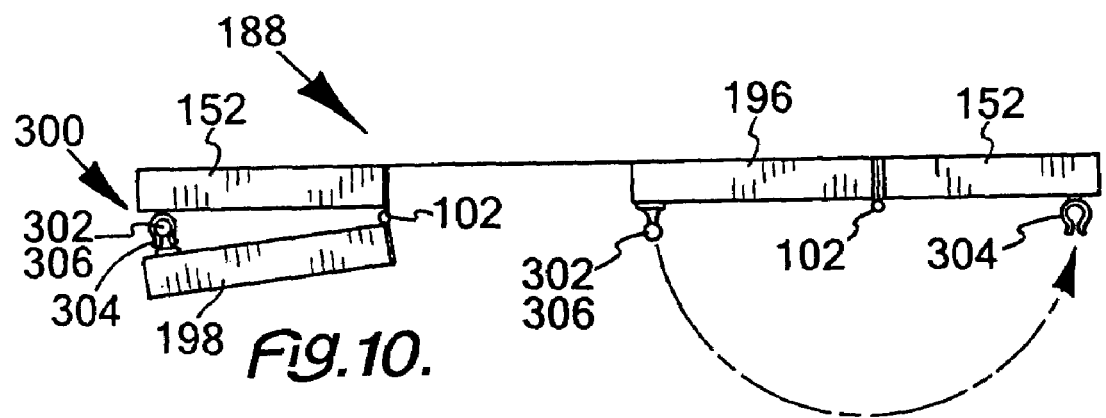
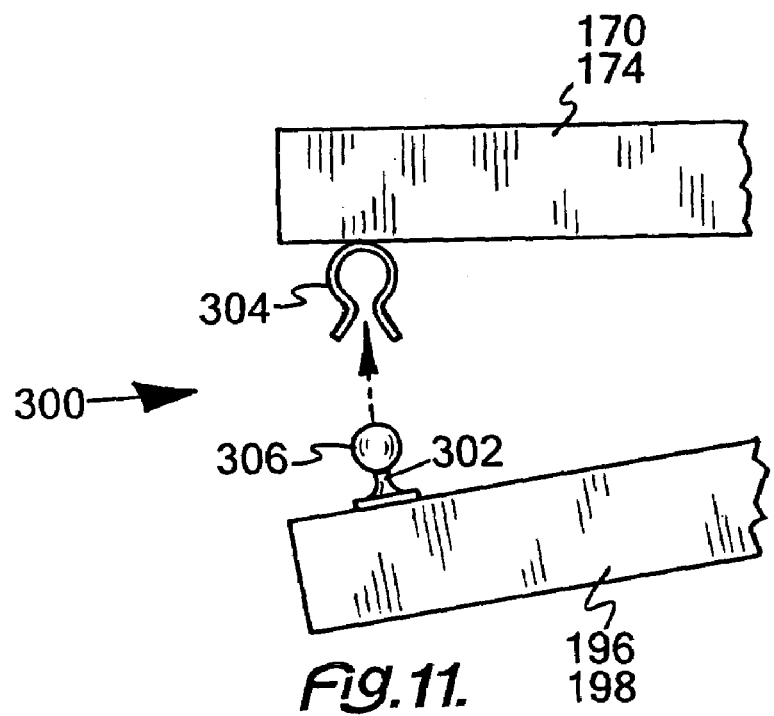

BIRDCAGE

This invention relates to a cage for an animal, and more particularly, to a cage for an animal, specifically birds, having doors which remain flush with the front of the cage when open, thereby preventing droppings and seeds from falling beyond the seed guard and a bird feeder for the cage.

BACKGROUND OF THE INVENTION

Pet owners, particularly pet owners with small animals, require a method of constraining their animals to a confined area so as to contain pet waste and food in domestic environments to particular locations. Pet cages are the most often used method for constraining the pet to the confined area. However, these devices commonly consist of an enclosure of bars. This allows the pet to spill waste or food in undesired areas. As a result, these cages often are equipped with waste guards protruding from the cage in order to prevent undesired spillage.

Furthermore, pet owners often desire a method of leaving food within a constrained area for the pet. As a result, the pet is normally fed by placing the food within a feed receiver. This enhances the owner's ability to maintain the hygiene of the cage by preventing waste and other contamination from coming into contact with the food. Additionally, these devices provide the pet owner with a trouble-free method of feeding the bird. These devices are often attached to the inside of the cage or through an opening through the use of a support mechanism.

One shortcoming of the prior art is the cage door design, which allows the front doors to extend beyond the waste guard. Pet owners regularly open the doors to the cage for cleaning, feeding, and pet entertainment. Particularly, pet owners regularly provide recreation by allowing access to the top of the cage. Very often pets, such as birds, cling to the open cage doors beyond the protruding waste guard consequently allowing food and pet waste to spill into undesired areas. This is a serious disadvantage of the prior art pet cage arrangements.

Moreover, the feed receiver designs often allowed the pet to remove the feed receiver from within the support mechanism. This would result in damage to the feed receiver and the necessity for a replacement. Consequently, prior art designs can result in unnecessary expenses to the pet owner. In addition, animals will often cling or sit above the feed receiver. This results in animal waste falling within and contaminating the feed receiver.

Furthermore, these feed receiver designs take up room within the cage. Consequently, there is a reduced amount of space to house the pet. Additionally, these designs often require that an individual reach within the cage in order to change and add contents to the feed receiver. This exposes the individual to physical harm from the pet especially individuals for which the pet is unfamiliar. These also are serious disadvantages of the prior art pet cage arrangements.

SUMMARY OF THE INVENTION

Among the many objectives of this invention is the provision of a cage door design, which prevents the spill of pet waste into undesired areas.

A further objective of this invention is the provision of a cage door design, in which no door of the cage extends beyond the waste guard when open.

Yet a further objective of this invention, is the provision doors, which are flush with the front of the cage when open.

As still further objective of this invention is the provision of a mechanism which maintains the doors flush when in the open position.

A still further objective of this invention is the provision of a feed receiver, which cannot be removed by the pet.

Another objective of this invention is the provision of a feed receiver design, which prevents the contamination of the food contained within.

Yet another objective of this invention is the provision of a feed receiver design, which is external to the cage.

Yet another objective of this invention is the provision of a feed receiver design, which reduces the risk injuries from the pet.

Also, an objective of this invention is the provision of a feed receiver design, which provides access to the feed receiver from the exterior of the cage.

A further objective of this invention is the provision of a feed receiver for a bird cage, which requires a reduced amount of room within the cage.

These and other objectives of the invention (which other objectives become clear by consideration of the specification, claims and drawings as a whole) are met by providing a bird cage with at least one flush mounted door for the cage when door is opened; and an accessible feed receiver for the cage, which can be retrieved and serviced without reaching inside the cage.

BRIEF DESCRIPTION OF THE DRAWINGS

FIG. 6 depicts a bottom, plan view of the slide door assembly 148 for the birdcage 100 with an exterior feeder 200.

FIG. 7 depicts a front, plan view of hinge door assembly 188 for the birdcage 100.

FIG. 8 depicts an outer perspective view of exterior feeder 200.

FIG. 9 depicts an inner perspective view of exterior feeder 200.

FIG. 10 depicts a top plan view of clip opener 300 for hinge door assembly 188.

FIG. 11 depicts a close-up, exploded top plan view of clip opener 300 for hinge door assembly 188.

Throughout the figures of the drawings, where the same part appears in more than one figure of the drawings, the same number is applied thereto.

DESCRIPTION OF THE PREFERRED EMBODIMENTS

For the bird cage of this invention, any shape is suitable. While the bird cage has at least one door, that door opens slidably along the interior or the exterior of the bird cage. More preferably, the door includes two parts, which slide open exteriorly to the bird cage and in opposite directions.

By being substantially flush or parallel with the cage when opened, the door or doors of the cage do not provide a perch for the bird exterior to the bird cage. This controls waste and feed location better than other bird cages. Structure for the doors is easily adjusted to achieve the desired position.

Mounted on the exterior of the bird cage is at least one feeding housing. The feeding housing is slidably locked onto the bird cage. The feeding housing opens into the bird cage and contains a feed receiver for food. It may also contain a feed receiver for water. On the exterior of the bird cage and within the feeding housing, is a back access door. The back access door provides access to the floor of the feeding housing which contains at least one dish for food or water.

On that dish is a clamp ring which slidably locks into a rail support mounted into the housing. Such a locking mechanism prevents the bird from having an access or ability to move the dish. However, the rail permits removal thereof through the back access door as desired by the caretaker, for filling, cleaning or other suitable purpose.

Figure 1:
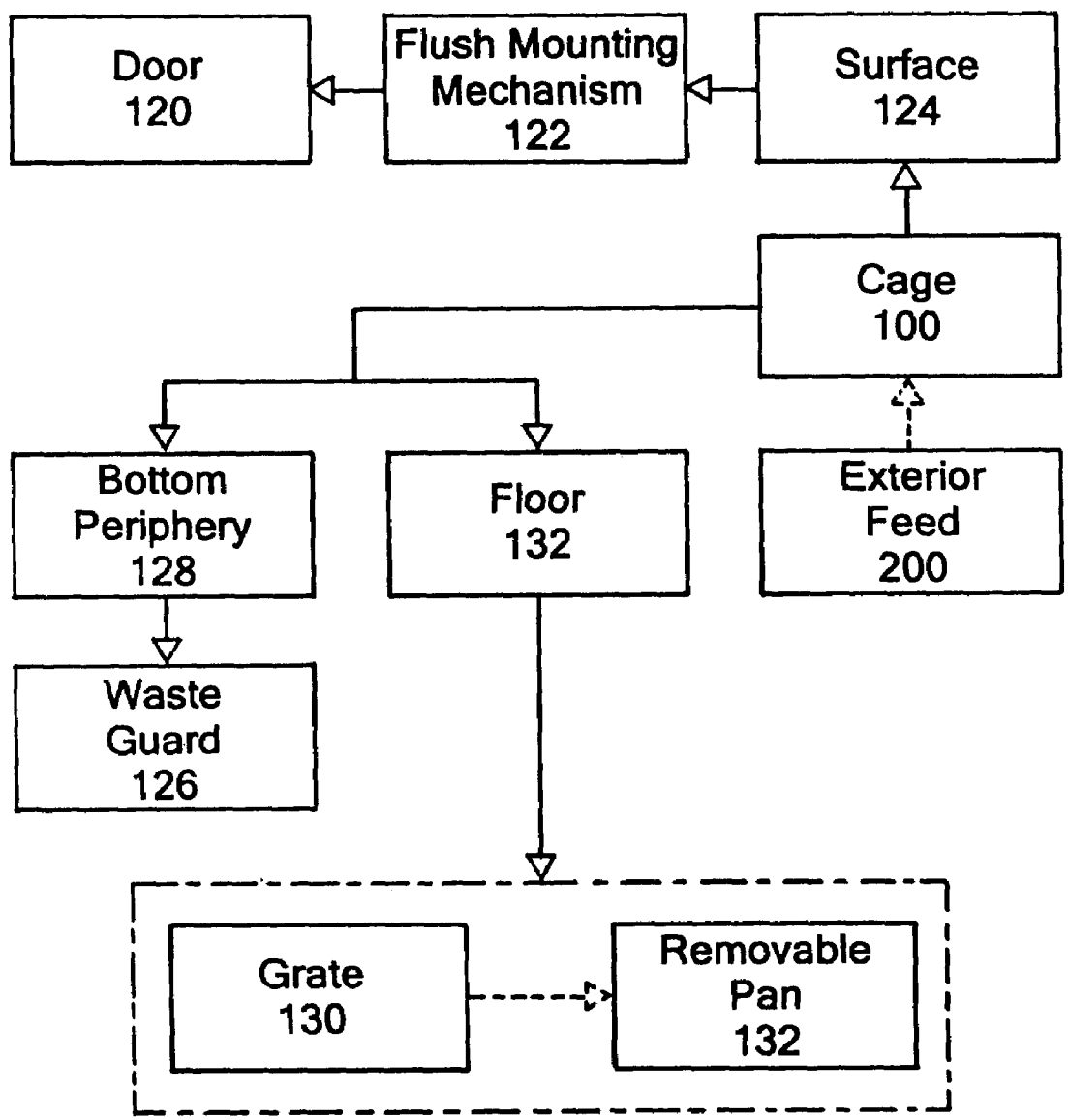
FIG. 1 depicts a block diagram of the birdcage 100 with an exterior feeder 200.

Referring now to FIG. 1, bird cage 100 of the invention, with any suitable shape, has at least one exterior feeder 200 mounted thereon. The door 120 is connected to a surface 124 of the bird cage 100 by at least one flush mounting mechanism 122. The flush mounting mechanism 122 allows the door 120 to be positioned substantially parallel to the surface 124 of the bird cage 100 for both opening and closing the door 120.

The bird cage 100 has a waste guard 126 protruding and surrounding the bottom periphery 128 of the bird cage 100 to prevent the pet (not shown) from spilling waste and food into undesired areas from the bird cage 100. Furthermore, a grate 130 forms the floor 132 of the bird cage 100 allowing smaller material, such as waste, to pass through while containing larger objects. The small material passes through the grate 130 into a removable pan 134, which is easily taken out and cleaned.

Referring now to FIG. 2, FIG. 3, FIG. 4, FIG. 5, and FIG. 6, rectangular bird cage 150 of the invention has at least one exterior feeder 200. With a slide door assembly 148, the front panel 152 of the rectangular bird cage 150 are preferably equal in size.

Within the front panel 152 are a first slidable door 154 and a second slidable door 156. First slidable door 154 and second slidable door 156 are substantially centrally located in front panel 152. Both first slidable door 154 and second slidable door 156 include mounting rods set in receiving slots. First slidable door 154 has first mounting rod 160 secured thereto and set in first receiving slot 164 on front panel 152. Second slidable door 156 has second mounting rod 162 secured thereto and set in second receiving slot 166 on front panel 152.

In contrast, the first outside section 170 and the second outside section 174 of the front panel 152 are secured to the top section 176 of the rectangular bird cage 150. The first outside section 170 is also secured to the first side section 180. Likewise, the second outside section 174 is secured to the second side section 182. As the first outside section 170 and the second outside section 174 are oppositely disposed from each other, so are first side section 180 and second side section 182. The rear section 184 is oppositely disposed from front panel 152.

The rectangular cage 150 has a waste guard 126 protruding and surrounding the bottom periphery 128 of the cage 150 to prevent the pet from spilling waste and food into undesired areas around the rectangular cage 150. Furthermore, a grate 130 forms the floor 132 of the cage 150 allowing smaller material, such as waste, to pass through while containing larger objects. The small material passes through the grate 130 into a removable pan 134, which is easily taken out and cleaned.

Figure 2:
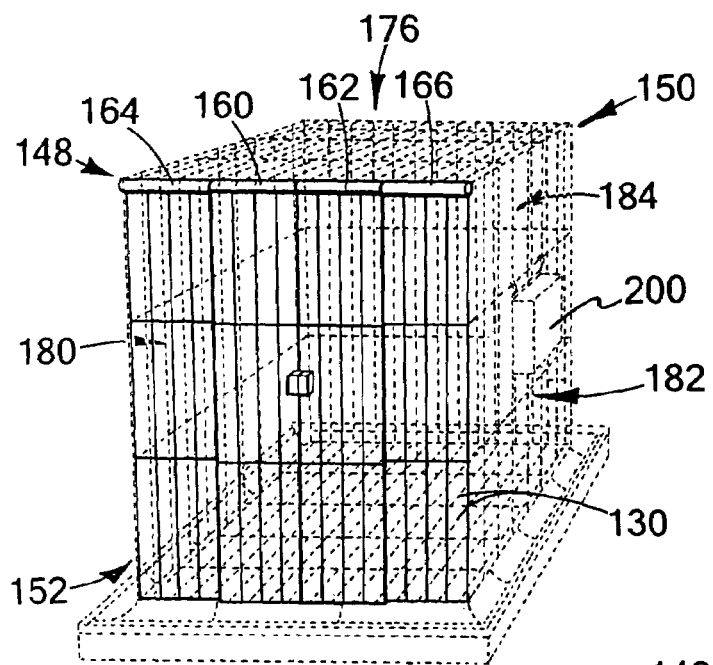
FIG. 2 depicts a front, perspective view of the slide door assembly 148 for the birdcage 100 with an exterior feeder 200.
Figure 3:
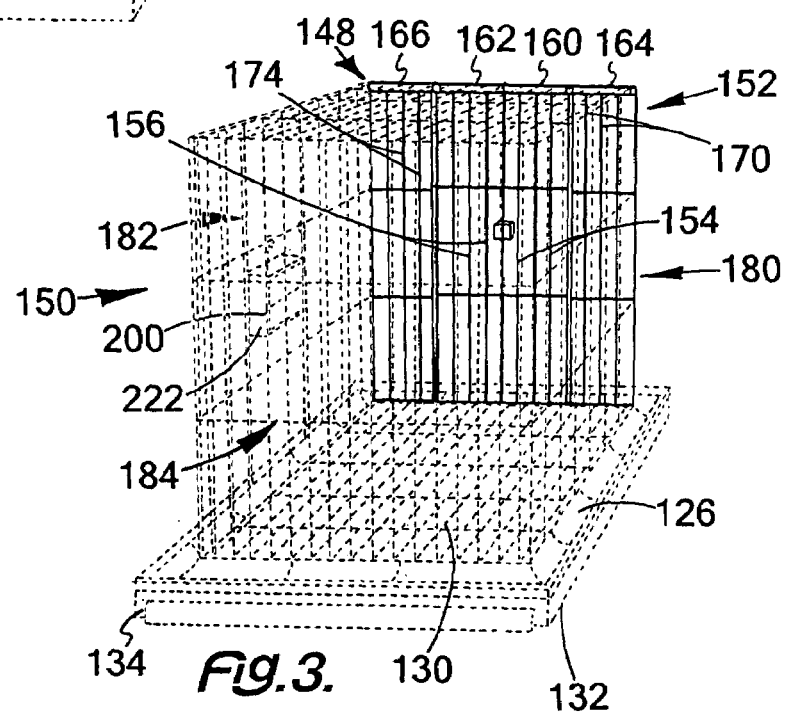
FIG. 3 depicts a rear, perspective view of the slide door assembly 148 for the birdcage 100 with an exterior feeder 200.
Figure 4:
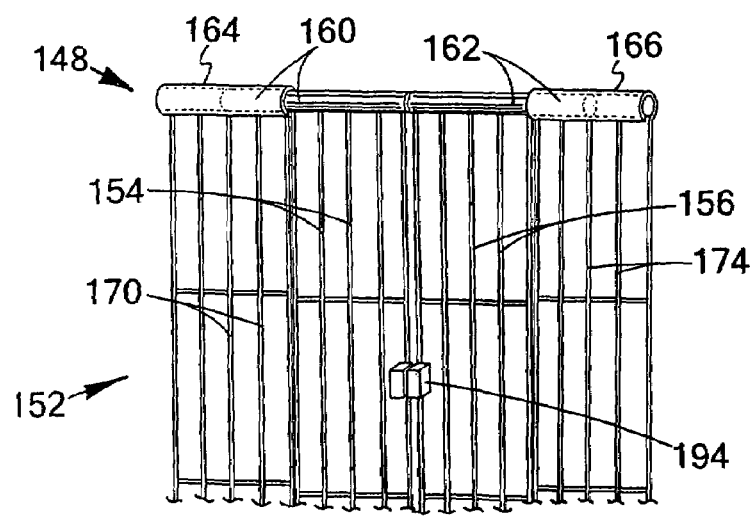
FIG. 4 depicts a front, plan view of the slide door assembly 148 for the birdcage 100.
Figure 5:
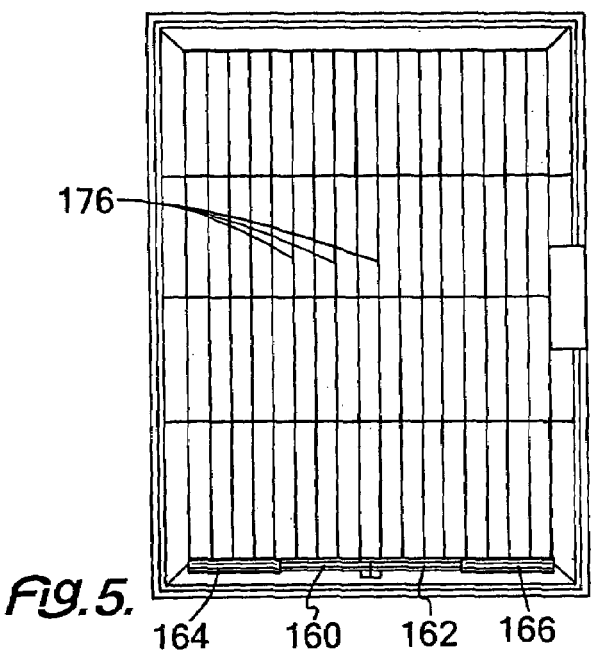
FIG. 5 depicts a top, plan view of the slide door assembly 148 for the birdcage 100 with an exterior feeder 200.

Especially considering FIG. 2, the front panel 152 of the cage 150 is shown in a closed position with first slidable door 154 and second slidable door 156 adjacent to each other and secured thereto with door lock 194. Friction holds first slidable door 154 and second slidable door 156 in an open position.

Alternatively considering FIG. 7, the front panel 152 includes hinge door assembly 188 and has first hinged door 196 and second hinged door 198 are each mounted on two of hinges 102 which are capable of swinging a full 180 degrees, thus allowing the first hinged door 196 and second hinged door 198 to open and remain flush with the front panel 152 when open, again minimizing the scattering of waste and food.

Furthermore, the two doors 196 and 198 are locked shut by two devices, the main latch 104, and a safety latch 106. These devices assure that the pet will remain safely within the confines of the cage 150 until the owner desires its removal. Thus, when opened first hinged door 196 and second hinged door 198 lay flush against the outside sections of the front panel 152, and consequently prevent the animal from clinging thereto and contaminating areas beyond the waste guard.

Figure 12:
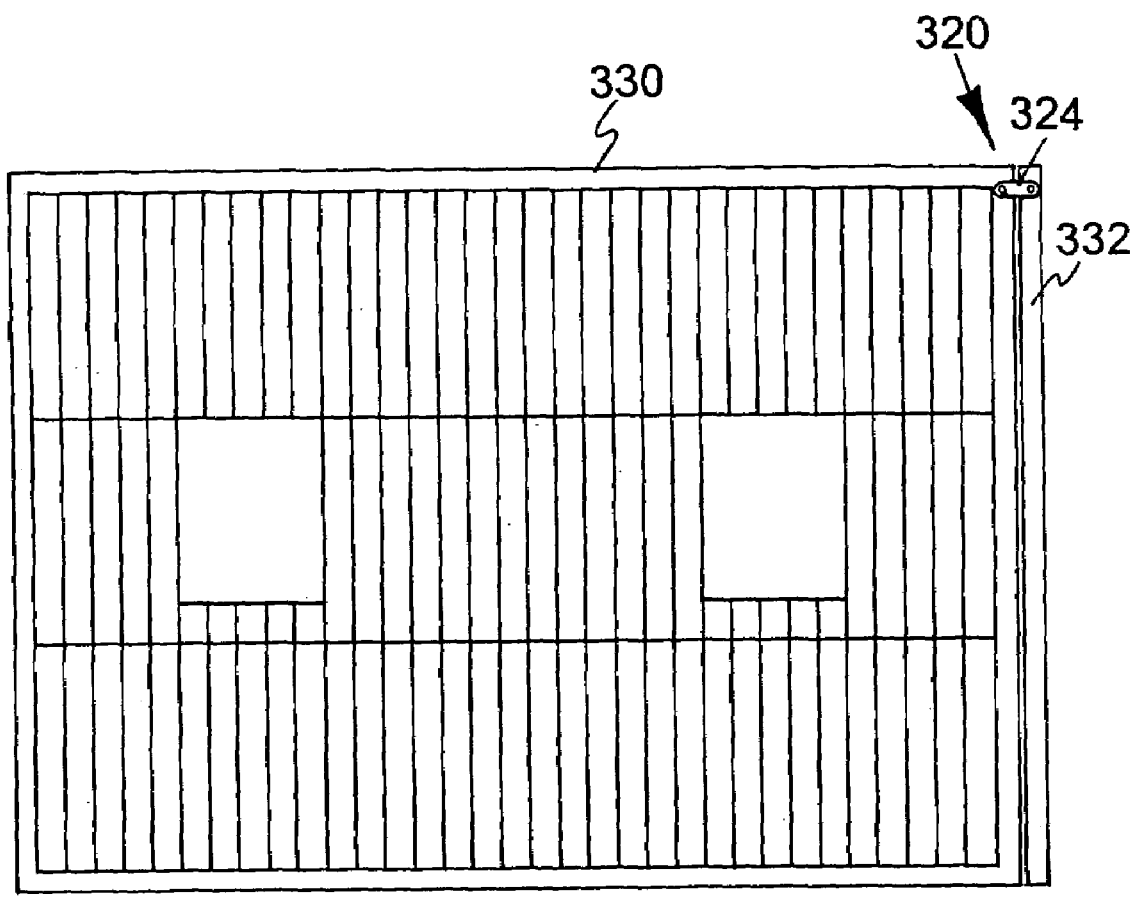
FIG. 12 depicts a front plan view of latch opener 320 for hinge door assembly 188.

Referring now to FIG. 10, FIG. 11, and FIG. 12, several affixing apparatus exist for maintaining the two doors 196 and 198 flush with the front panel 152. As a first example, the hinges 102 may be precision hinges and thus utilize the force of friction to maintain door 196 and 198 flush.

Alternatively, with continuing reference to FIG. 10 and FIG. 11, the affixing apparatus may consist of an affixing clamp mechanism 300. The affixing clamp mechanism 300 includes a metal post 302 and an affixing clamp 304. A round head 306 is formed at the end of the metal post 302. Either a metal post 302 or a affixing clamp 304 is connected to the outside edge of the front of doors 196 and 198 oppositely disposed from the hinges 102. A antipodal affixing clamp member is then connected to the outermost edge of the front panel 152 juxtaposed to the side sections 180 and 182 along the same latitudinal line as the opposite antipodal member (FIG. 2 and FIG. 3. When doors 196 and 198 are fully open, the round head 306 of the metal post 302 engages the affixing clamp 304 and thereby secures doors 196 and 198 in an open position.

Figure 13:
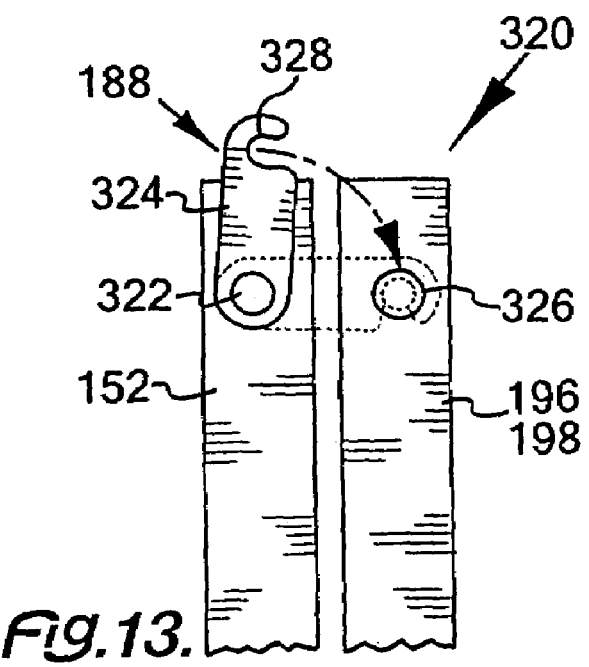
FIG. 13 depicts a close-up, exploded top plan view of latch opener 320 for hinge door assembly 188.

Now referring to FIG. 12 and FIG. 13, an alternative embodiment of the affixing apparatus is shown. This swivel affixing mechanism 320, the side edge of doors 196 and 198 oppositely disposed from the hinges 102 contains a swivel 324. A locking screw 326 is connected to edge of side sections 180 and 182 juxtaposed to the front panel 152. The locking screw 326 extends outwardly and parallel to the front panel 152. The end of the swivel 324 connected to the side edge of the doors 196 and 198 contains a rotating connection 322 along the same latitudinal line as the locking screw 326. Thus when the doors are in fully open, the swivel 324 may be rotated thereby inserting the swivel notch 328 over the locking screw 326. Consequently, the doors 196 and 198 are secured flush with the front panel.

As a result, the front door design is one of the distinct advantages of the invention. By maintaining the open doors flush with the cage, the pet has no area to cling beyond the waste guard therefore providing a solution to previous cage door designs.

Adding FIG. 8 and FIG. 9 to the consideration, an embodiment for the exterior feeder 200 for either cage 100 or 150 is shown. The exterior feeder 200 for this invention sits within a feeder opening 222, which is preferably spaced away from the doors. The rear view of the exterior feeder 200 has feed receiver 224 sitting within a feeder floor 226.

A first feeder side wall 230 and a second feeder side wall 232 extend upwardly from feeder floor 226 to a transparent top 236. A back access door 238 provides access to the feed receiver 224. The back access door 238 can be closed and locked with the feed receiver 224 present or without the feed receiver 224 present. In this embodiment, the exterior feeder 200 sits below a clamp ring 240, which secures the feed receiver 224 within the exterior feeder 200.

The clamp ring 240 is in turn affixed to first feeder side wall 230 and a second feeder side wall 232, through the use of one or more rivets 242 or bolting mechanism 244. Any securing mechanism may be used to affix the clamp ring 240 to the side walls. However, in this embodiment, the side walls and the clamp ring 240 are secured by placing at least one bolting mechanism 244 therethrough or through the rivets 242.

Furthermore, the exterior feeder 200 includes several features for protecting both the pet owner and the pet. The back access door 238 swings open allowing access to the feed receiver or feed receiver 224 from the back, thereby permitting the pet owner access without having to reach inside the cage. The back access door may be secured by a back door lock 294 to ensure it remains closed until its desired removal. Furthermore, unlike many prior art designs, the back access door 238 can be relocked once the feed receiver 224 is removed.

In addition, the roof of the exterior feeder 200 has a transparent top 236 and a fixed solid hood 250. The fixed solid hood 250 sits on top of the transparent top 236 and protects the contents of the feed receiver 224 therein from waste and other contaminants. The area of the transparent top 236 not covered by the fixed solid hood 250 provides the pet owner with the ability to see the contents of the feed receiver 224.

Several tabs 262 are placed within the inside periphery of the clamp ring 240 in order to prevent the pet from dislodging the feed receiver 224 from the exterior feeder 200. The tabs 262 next to the first feeder side wall 230 and a second feeder side wall 232 are placed just above one of the rivet 242 or bolting mechanism 244 thereby allowing the tabs 262 to withstand a greater amount of force from the pet.

Moreover, two mounting hooks 270 and two mounting brackets 274 are affixed to the front opening 276 of the exterior feeder 200 for securing the exterior feeder 200 to the cage 150. The mounting hooks 270 are placed on the top corners 278 of the front of the exterior feeder 200. The mounting brackets 274 are placed on the bottom corners 280 of the feed housing 220 such that the arm of the mounting brackets 274 rest on the cage 150.

Figure 15:
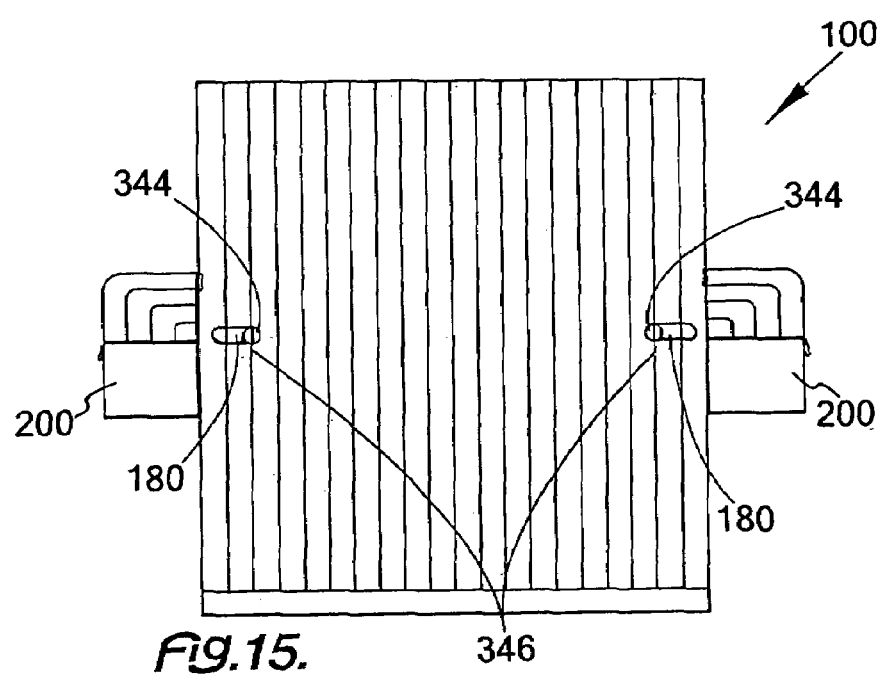
FIG. 15 depicts an end plan view of perch bar 340 mounted in bird cage 100.

The mounting hooks are placed on top of the feeder opening 222 within a structure in the cage 150 such that the front open area of the exterior feeder 200 is exposed to the inside of the cage 150. A securing mechanism, such as a clamp or screw, is placed within mounting bracket apertures 292 thereby securing the feeder receiver 224 to the cage 150. Thus, the feeder receiver 224 may sit externally at any place on the surface of the cage 150 regardless of the position chosen for the feeder opening 222 (FIG. 15).

Referring now to FIG. 10 and FIG. 11, clip opener 300 for hinge door assembly 188 provides a convenient method or device for holding the first hinged door 196 and the second hinged door 198 in an open position. Clip opener 300 includes ball grip 302 mounted on front panel 152. On first hinged door 196 and second hinged door 198 is ball mount 304 having a latching member 306 to be received in ball grip 302. Clip opener 300 serves to hold either first hinged door 196 or second hinged door 198 in an open position, and close to front panel 152. In this fashion, a bird cannot sit on first hinged door 196 and second hinged door 198. The positions of the ball grip 302 and ball mount 304 are reversible, but the depicted manner is preferred.

Referring now to FIG. 12 and FIG. 13, swivel affixing mechanism 320 for hinge door assembly 188 provides a convenient method or device for holding the first hinged door 196 and the second hinged door 198 in an open position. Latch opener 320 includes clip pin 322 mounted on front panel 152. Around clip pin 322 rotates clip arm 324.

On first hinged door 196 and second hinged door 198 is clip mount 326. Clip arm 324 includes an end slot 328 adapted to receive clip mount 326. This structure serves to hold either first hinged door 196 or second hinged door 198 in an open position, and close to front panel 152. In this fashion also, a bird cannot sit on first hinged door 196 and second hinged door 198. The positions of the clip arm 324 and clip mount 326 are reversible, but the depicted manner is preferred.

More particularly, from FIG. 13, swivel affixing mechanism 320, includes a cage side 330 and a door side 332, to support swivel 324. Swivel notch 328 hooks on the locking screw 326, which is mounted on cage side 330 at swivel notch 328. Rotating connection 322, which holds swivel 324 on door side 332 permits this function, so that the bird cannot swing to undesirable position and stole food and waste outside a desired area.

Figure 14:
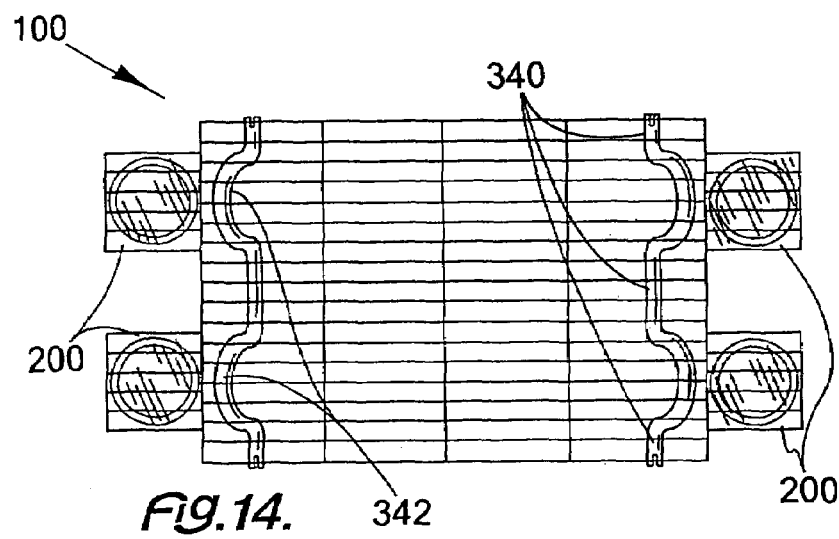
FIG. 14 depicts a top plan view of perch bar 340 mounted in bird cage 100.
Figure 16:
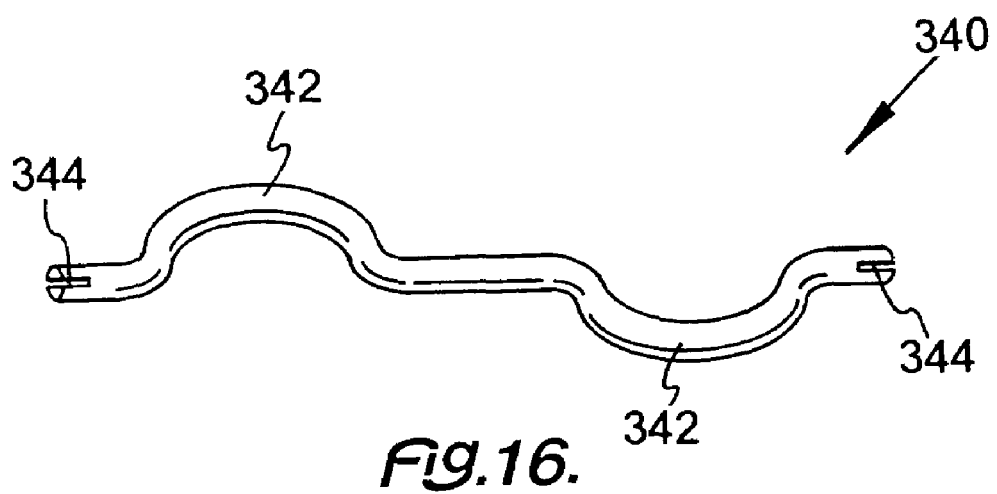
FIG. 16 depicts a top plan view of perch bar 340 as unmounted or free standing.

Referring now to FIG. 14, FIG. 15 and FIG. 16, a perch bar 340 is mounted in bird cage 100 to provide easy access to each exterior feeder 200. Perch bar 340 is an elongated, preferably cylindrical rod having a feeding arc 342 for each exterior feeder 200. At each end of the perch bar 340 is a slotted bar grip 344 capable of frictionally or otherwise joining an opposing cage bar 346.

Perch bar 340 has bends therein to form the required number of feeding arcs 342, for each exterior feeder 200. As shown in FIG. 16, it is possible to rotate the perch bar 340 for 180 degrees, in order to adjust the position of the feeding arc 342. Such an adjustment facilitates feeding birds of different sizes. Feeding arcs 342 may also be reversed on the same perch bar 340, as shown in FIG. 16.

Furthermore, the perch bar 340 may also compensate for the size of the bird by mounting the perch bar 340 on different bars of the cage 100. Feeding arcs 342 may also be combined into one feeding arc 342, and faced toward either the center of cage 100 or toward exterior feeder 200. Such positioning also adjusts for the size of the bird.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A cage for housing a pet comprising:
    the cage having a top panel;
    the top panel interconnecting to an upstanding front panel and at least one upstanding lateral wall to define a generally enclosed area for the pet;
    the front panel dividing into at least one fixed section and at least one door;
    the at least one fixed section and the at least one door attaching by at least one hinge;
    the hinge swinging the at least one door substantially flush with the at least one fixed section;
    a feeder;
    the feeder having a feeder floor;
    at least one upstanding lateral feeder side wall interconnecting to the feeder floor;
    a feeding perch being mounted in the cage;
    the at least one upstanding lateral feeder side wall interconnecting to a feeder top thereby defining a generally enclosed area for a feed receiver except for a front feeder opening;
    the at least one upstanding lateral wall containing a wall feeder opening being spaced at least a small distance away from the front panel;
    the feeder affixing to the exterior of the wall feeder opening thereby exposing the front feeder opening to the inside of the cage;
    the at least one upstanding feeder side wall having two feeder lateral side walls and a back access door;
    the back access door providing external access to the feed receiver;
    a clamp ring affixing to the two lateral side walls for securing the feed receiver;
    the feeder top being transparent;
    a fixed solid hood covering a portion of the feeder top thereby protecting the feed receiver and allowing for visibility of the feed receiver;
    the clamp ring being positioned on the top of the feed receiver; and
    at least one tab attaching to the inside periphery of the clamp ring for further securing the feed receiver.

2. A cage for housing a pet according to claim 1 wherein the at least one tab having a side wall tab along each lateral side wall and a front opening tab adjacent to the front feeder opening.

3. A cage for housing a pet according to claim 2 wherein:
    (a) the clamp ring is affixing to each feeder side wall through a rivet;
    (b) each rivet having at least one bolt securing the clamp ring;
    (c) each side wall tab being positioned on top of the at least one bolt;
    (d) a mounting hook connecting to each top corner of the front opening and a mounting bracket connecting to each bottom corner of the front feeder opening thereby affixing the feeder to the exterior of the wall feeder opening; and
    (e) a back door lock securing the back access door in a closed position.

* * * * *